(12) United States Patent  (10) Patent No.: US 9,118,749 B2
Kim et al.  (45) Date of Patent: Aug. 25, 2015

(54) DESKTOP-TYPE UNIVERSAL DOCK

(71) Applicant: Samsung Electronics Co. Ltd., Suwon-si, Gyeonggi-do (KR)

(72) Inventors: Se-Jin Kim, Osan-si (KR); Jin-Hee Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/753,898

(22) Filed: Jan. 30, 2013

(65) Prior Publication Data

US 2013/0217448 A1 Aug. 22, 2013

(30) Foreign Application Priority Data

Feb. 16, 2012 (KR) .......................... 10-2012-0015608

(51) Int. Cl.
| | |
|---|---|
| *H04B 1/38* | (2006.01) |
| *H04M 1/02* | (2006.01) |
| *G06F 1/16* | (2006.01) |
| *H04M 1/06* | (2006.01) |

(52) U.S. Cl.
CPC ............ *H04M 1/0254* (2013.01); *G06F 1/1632* (2013.01); *H04M 1/06* (2013.01)

(58) Field of Classification Search
CPC .......... H04M 1/04; H04M 1/06; G06F 1/1632
USPC .............. 455/575.1, 569.1, 573; 361/679.01; 379/454, 455
See application file for complete search history.

(56) References Cited

U.S. PATENT DOCUMENTS

| | | | |
|---|---|---|---|
| 6,457,996 B1 * | 10/2002 | Shih .............................. 439/638 |
| 8,559,172 B2 * | 10/2013 | Byrne ...................... 361/679.41 |
| 8,634,883 B2 * | 1/2014 | Hong et al. ................ 455/575.1 |
| 2005/0255895 A1 * | 11/2005 | Lee et al. ....................... 455/573 |
| 2006/0050866 A1 * | 3/2006 | Sewall ...................... 379/428.02 |
| 2006/0181840 A1 * | 8/2006 | Cvetko .......................... 361/679 |
| 2007/0038434 A1 * | 2/2007 | Cvetko ........................... 703/23 |
| 2008/0026794 A1 * | 1/2008 | Warren ......................... 455/557 |
| 2009/0073642 A1 * | 3/2009 | Jubelirer et al. .......... 361/679.01 |
| 2009/0129010 A1 * | 5/2009 | Park et al. ............... 361/679.56 |
| 2011/0043984 A1 * | 2/2011 | Byrne ...................... 361/679.01 |
| 2011/0095724 A1 * | 4/2011 | Byrne .......................... 320/115 |
| 2011/0143583 A1 * | 6/2011 | Zilmer et al. ................. 439/529 |
| 2011/0164375 A1 * | 7/2011 | Hayashida et al. ....... 361/679.41 |
| 2012/0021808 A1 * | 1/2012 | Tseng ........................ 455/575.1 |
| 2012/0302288 A1 * | 11/2012 | Born et al. ..................... 455/557 |
| 2013/0016463 A1 * | 1/2013 | Hiramoto et al. ......... 361/679.01 |
| 2013/0241470 A1 * | 9/2013 | Kim .............................. 320/107 |

* cited by examiner

*Primary Examiner* — Duc M Nguyen
(74) *Attorney, Agent, or Firm* — Jefferson IP Law, LLP

(57) ABSTRACT

A universal dock for a mobile phone is provided. The universal dock includes a base supporter, a universal cradle coupled to the base supporter and adapted to cradle mobile phones of various sizes or types, and a connector rotatably mounted on the universal cradle.

5 Claims, 7 Drawing Sheets

DESKTOP-TYPE UNIVERSAL DOCK

PRIORITY

This application claims the benefit under 35 U.S.C. §119 (a) of a Korean patent application filed in the Korean Intellectual Property Office on Feb. 16, 2012 and assigned Serial No. 10-2012-0015608, the entire disclosure of which is hereby incorporated by reference.

BACKGROUND OF THE INVENTION

1. Field of the Invention

The present invention relates to a mobile phone. More particularly, the present invention relates to a desktop-type universal dock capable of charging or retaining mobile phones of various sizes or types.

2. Description of the Related Art

In general, a mobile phone refers to a cellular phone, a Personal Digital Assistant (PDA), a smart phone, a tablet Personal Computer (PC), etc. A mobile phone can be used, when the power is depleted, after being recharged using a charging cradle, which can retain the mobile phone at an angle in a TV mode or Digital Multimedia Broadcasting (DMB) mode so that the user can conveniently watch the screen of the display unit.

The mobile phone has an embedded or releasable battery, which is recharged by a charging cradle when power is used up. The charging cradle can retain the mobile phone in a horizontal or vertical position, but typically in a slanted position.

There are various types of charging cradles, a typical example of which includes a dedicated receiving space, in which a mobile phone rests, and a connector for connection with a charging terminal of the mobile phone or with a charging terminal of a separate auxiliary battery pack.

However, conventional cradles for mobile phones have a problem in that mobile phones of different specifications require dedicated charging cradles, meaning that, when a user needs to replace his/her malfunctioning or missing mobile phone, a dedicated charging cradle also needs to be purchased, which is uneconomical.

Furthermore, each manufacturer makes a different charging cradle, or each cell phone model requires its own charging cradle. The fact that a dedicated charging cradle needs to be manufactured for each mobile phone increases the manufacturing cost.

Therefore, a need exists for a universal dock for a mobile phone.

SUMMARY OF THE INVENTION

Aspects of the present invention are to address at least the above-mentioned problems and/or disadvantages and to provide at least the advantages described below. Accordingly, an aspect of the present invention is to provide a desktop-type universal dock capable of retaining a mobile phone with no limitation on the mobile phone's overall size (transverse size, longitudinal size, thickness) or type (bar type, sliding type, folder type, etc.), thereby improving user convenience.

Another aspect of the present invention is to provide a desktop-type universal dock which can be manufactured at a lower cost, thereby giving its manufacturer economic merits.

In accordance with an aspect of the present invention, a universal dock for a mobile phone is provided. The universal dock includes a base supporter, a universal cradle coupled to the base supporter and adapted to cradle mobile phones of various sizes or types, and a connector rotatably mounted on the universal cradle.

In accordance with another aspect of the present invention, a universal dock for a mobile phone is provided. The universal dock includes a base supporter, a universal cradle coupled to the base supporter in a slanted position and adapted to cradle mobile phones of various sizes or types, a connector rotatably mounted on the universal cradle by a housing, and an elastic body mounted on the base supporter and adapted to remain forced against the housing and to support the connector so that the connector returns to a predetermined state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
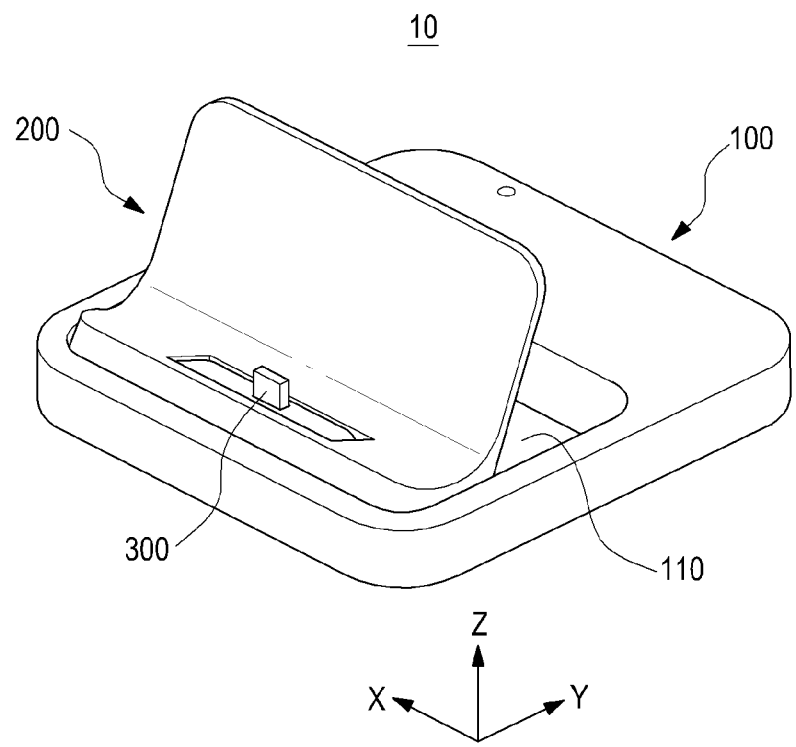
FIG. 1 is an assembled perspective view of a universal dock according to an exemplary embodiment of the present invention.

FIG. 1 is an assembled perspective view of a universal dock according to an exemplary embodiment of the present invention.

FIG. 1 shows a universal dock according to an exemplary embodiment of the present invention with reference to a three-dimensional Cartesian coordinate system, wherein the X-axis corresponds to the left/right (transverse) direction of the dock, the Y-axis corresponds to the front/rear (longitudinal) direction of the dock, and the Z-axis corresponds to the up/down (vertical) direction of the dock.

Referring to FIG. 1, a universal dock 10 according to an exemplary embodiment of the present invention is used as a cradle or a charging cradle for a mobile phone, and more specifically as a cradle or a charging cradle for mobile phones of various sizes or types. As used herein, mobile phones of various sizes refer to mobile phones having various dimensions of transverse length, longitudinal length, and thickness. This means that the universal dock 10 according to an exemplary embodiment of the present invention is independent of the mobile phone size, in terms of mobile phone retaining, so that it can retain a mobile phone of any transverse length/longitudinal length/thickness at a predetermined angle.

In addition, mobile phones of various types include, in terms of appearance, bar types, sliding types, folder types, etc., as well as cellular phones, Personal Digital Assistants (PDAs), smart phones, tablet Personal Computers (PCs), electronic books, Motion Picture Experts Group (MPEG)-2 Audio Layer III (MP3) players, etc.

Figure 2:
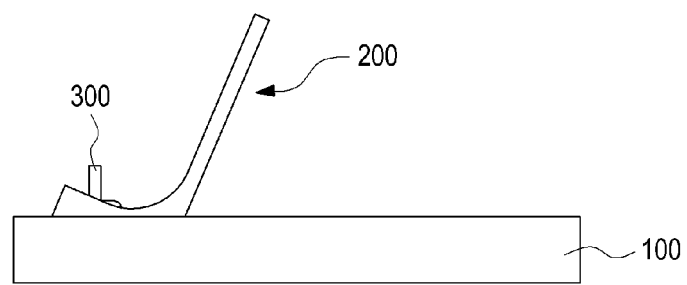
FIG. 2 is a lateral view of a universal dock according to an exemplary embodiment of the present invention, prior to rotation of its connector.
Figure 3:
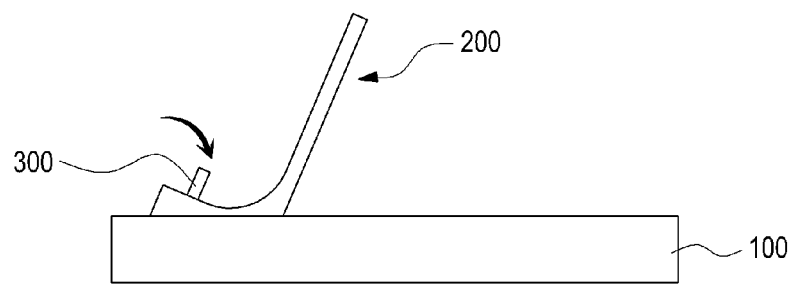
FIG. 3 is a lateral view of a universal dock according to an exemplary embodiment of the present invention, after rotation of its connector.

FIG. 2 is a lateral view of a universal dock according to an exemplary embodiment of the present invention, prior to rotation of its connector. FIG. 3 is a lateral view of a universal dock according to an exemplary embodiment of the present invention, after rotation of its connector.

Referring to FIGS. 1-3, the universal dock 10 includes a base supporter 100, a universal cradle 200, and a connector 300. The base supporter 100 is placed on a table, and the cradle 200 is coupled to the base supporter 100 in a slanted position. The connector 300 is mounted on the cradle 200 and is always exposed. FIG. 2 shows the connector 300 when it stands upright with no external force acting on it according to an exemplary embodiment of the present invention, and FIG. 3 shows the connector 300 when it is acted on by an external force and rotated by a predetermined angle rearward according to an exemplary embodiment of the present invention. Reference numeral 110 in FIG. 1 refers to an opening.

Figure 4:
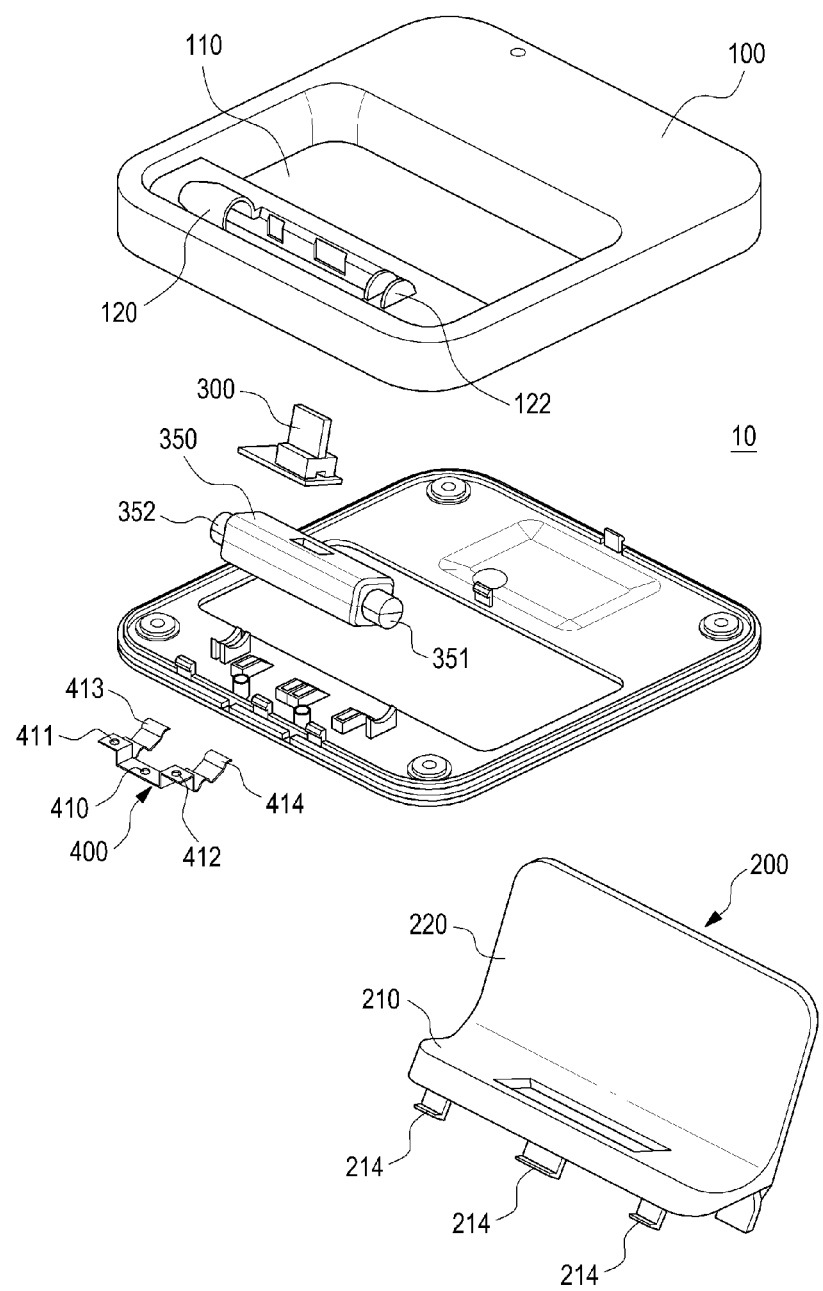
FIG. 4 is an exploded perspective view of a universal dock according to an exemplary embodiment of the present invention.

FIG. 4 is an exploded perspective view of a universal dock according to an exemplary embodiment of the present invention.

Figure 10:
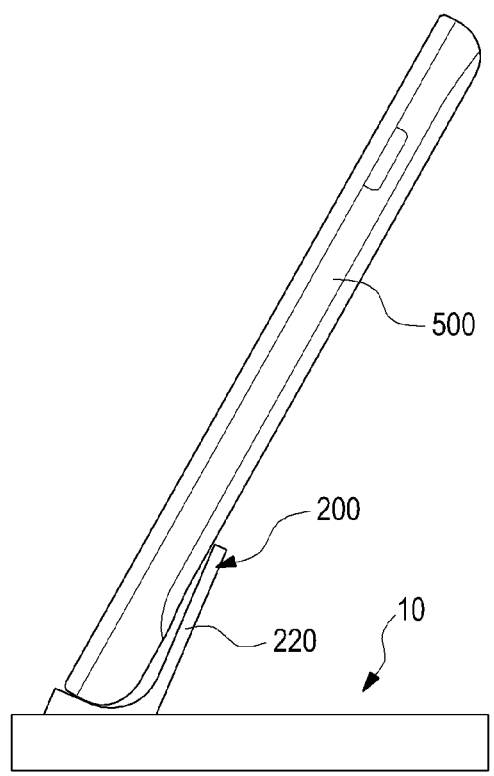
FIG. 10 is a lateral view of a universal dock according to an exemplary embodiment of the present invention, after a mobile phone is connected to its connector, rotated, and retained on the cradle in a slanted position.

Referring to FIG. 4, the base supporter 100 has a pair of hinge arms 120 and 122 in the front area to enable rotation of a housing 350. The hinge arms 120 and 122 extend in the transverse direction. The cradle 200 is mounted on the base supporter 100 to support mobile phones of various sizes or types at a predetermined angle. Specifically, the cradle 200, when retaining a mobile phone, contacts and supports an area of the mobile phone below its middle portion (i.e., lower portion). For example, FIG. 10 shows a mobile phone retained on the cradle 200 in a slanted position.

The cradle 200 includes a base 210 and a supporter 220 extending integrally from the base 210 in a predetermined direction. The connector 300 is rotatably received and arranged in the base 210, which is fixed to the base supporter 100. The base 210 is fixed to the base supporter 100 in a slanted position. The base 210 has an opening 212 for receiving the housing 350, to which the connector 300 is fixed, and a number of fasteners 214, e.g. hooks, positioned on the lower end to be fixed to the base supporter 100.

The supporter 220 extends from the base 210 in an approximately perpendicular direction so that, when the base 210 is mounted on the platform in a slanted position, the supporter 220 extends a predetermined length from the base supporter 100 in a slanted direction. The supporter 220 has a plate shape, and is adapted to retain a mobile phone, which is connected to the connector 300, in a slanted position. That is, the supporter 220 contacts and supports the bottom surface of the retained mobile phone.

The connector 300, which is a universal connector, is received in the base 210 and mounted so as to rotate. FIG. 2 shows the connector 300 prior to rotation, and FIG. 3 shows the connector 300 after rotation.

The housing 350 is adapted to receive the connector 300 and rotate it inside the base, and has hinges 351 and 352 on both lateral ends, respectively. The housing 350 is supported by an elastic body 400, which exerts force so as to return the housing 350 to its initial position as shown in FIG. 2.

The elastic body 400 is mounted inside the base 210 and is positioned to remain forced against a predetermined portion of the housing 350, thereby providing force so as to always move the housing 350 towards its original position. The elastic body 400 has the shape of a leaf spring and includes a number of fixed ends 410, 411, and 412 and at least one free end 413 and 414. The fixed ends 410, 411, and 412 are fastened and fixed to the base 210, and the free ends 413 and 414 are positioned to be forced against the outer surface of the housing 350. Rotation of the housing 350 is followed by sliding of the free ends 413 and 414 on the outer surface of the housing. There are three fixed ends, including a center fixed end 410 and left and right fixed ends 411 and 412. The free ends include left and right free ends 413 and 414 extending from the left and right fixed ends 411 and 412 in a perpendicular direction, respectively. The left and right free ends 413 and 414 are symmetric to each other, and are forced against the outer surface of the housing 350 symmetrically. The left and right free ends 413 and 414 have curved shapes, so that they can smoothly slide on the outer surface of the housing 350. The left and right fixed ends 411 and 412 are obtained by bending left and right extensions of the center fixed end 410 twice, respectively, and the left and right free ends 413 and 414 are obtained by bending extensions of the left and right fixed ends 411 and 412 a number of times, respectively.

Figure 5:
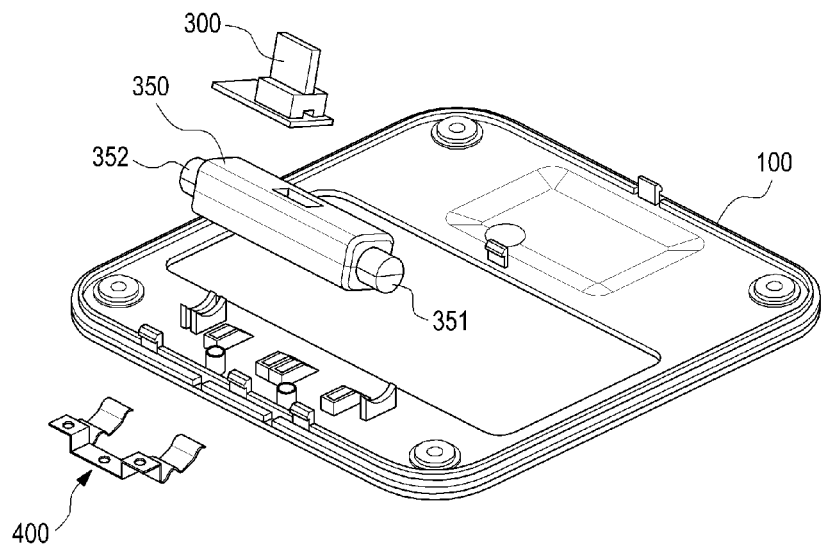
FIG. 5 is a perspective view of a universal dock according to an exemplary embodiment of the present invention, prior to mounting of a connector.
Figure 6:
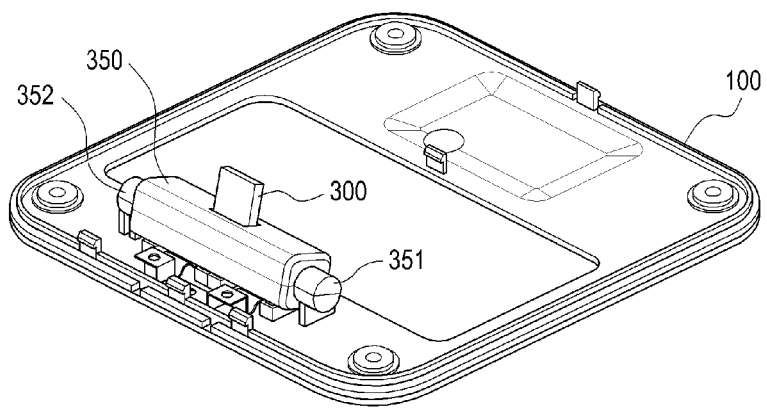
FIG. 6 is a perspective view of a universal dock according to an exemplary embodiment of the present invention, after mounting of a connector.

FIG. 5 is a perspective view of a universal dock according to an exemplary embodiment of the present invention, prior to mounting of a connector. FIG. 6 is a perspective view of a universal dock according to an exemplary embodiment of the present invention, after mounting of a connector.

Referring to FIGS. 5 and 6, the connector is fixed to the housing, and the hinges of the housing are positioned on the support of the base, with the elastic body mounted between the housing and the base. The fixed ends of the elastic body are fixed by fasteners (not shown).

Figure 7:
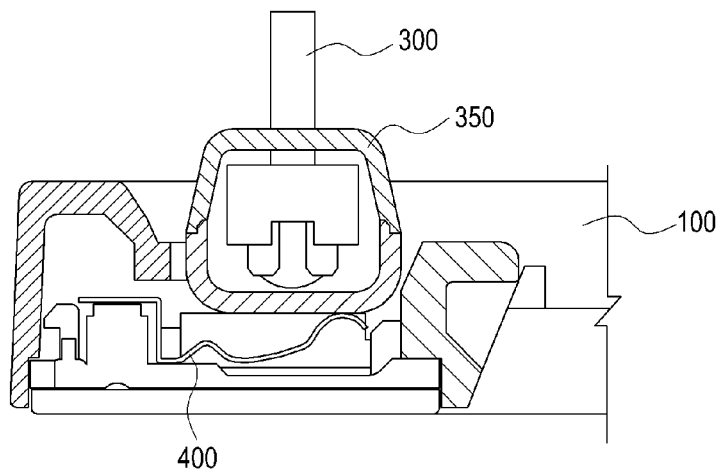
FIG. 7 is a sectional view of a universal dock according to an exemplary embodiment of the present invention, prior to rotation of its connector.
Figure 8:
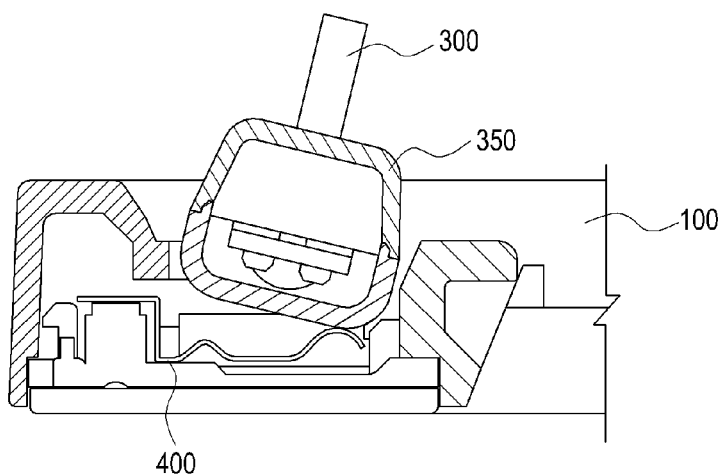
FIG. 8 is a sectional view of a universal dock according to an exemplary embodiment of the present invention, after rotation of its connector.

Rotation operations of the housing 350, on which the connector 300 is mounted, will be described with reference to FIGS. 7 and 8. As shown in FIG. 7, when the elastic body 400 is mounted on the base 210, the left and right free ends 413 and 414 remain forced against the outer surface of the housing 350, specifically its bottom surface, and support the housing 350 in the upright position. When an external force acts on the housing 350, for example, when a mobile phone connects to the connector 300 and rotates due to its own weight, the left and right free ends 413 and 414 move approximately downwards and remain forced against a predetermined area of the bottom surface of the housing 350, thereby supporting the rotated housing 350. When the mobile phone is disconnected from the connector 300, the elastic body 400 returns the housing 350 to its initial position as shown in FIG. 7. The force necessary to return the housing 350 is provided by the elastic body 400. During rotation of the connector 300, a predetermined portion of the outer surface of the housing 350 and the left and right free ends 413 and 414 make a sliding surface contact.

Figure 9:
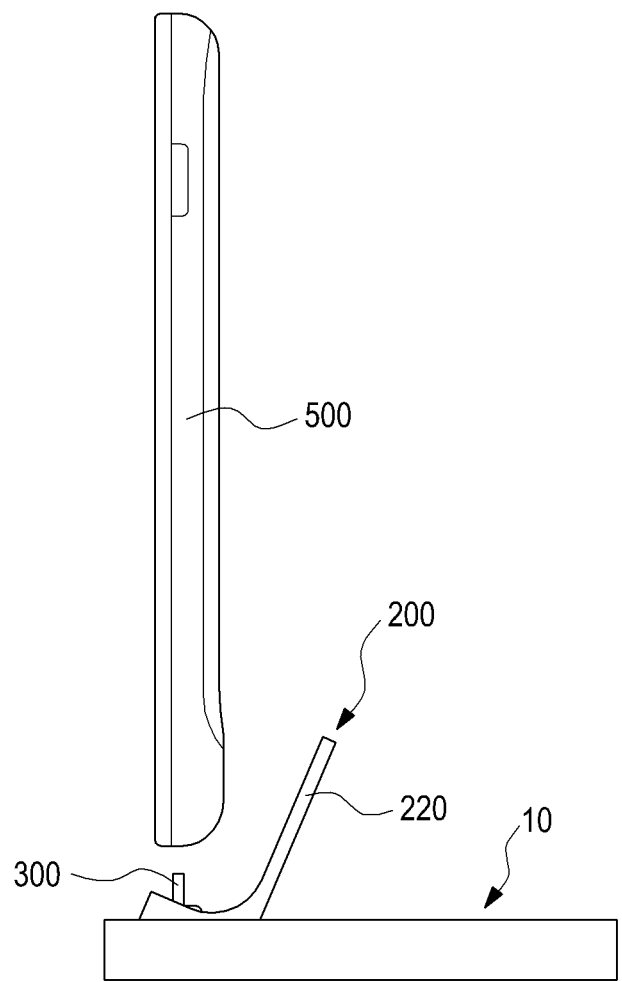
FIG. 9 is a lateral view of a universal dock according to an exemplary embodiment of the present invention, before a mobile phone is connected to its connector.

FIG. 9 is a lateral view of a universal dock according to an exemplary embodiment of the present invention, before a mobile phone is connected to its connector. FIG. 10 is a lateral view of a universal dock according to an exemplary embodiment of the present invention, after a mobile phone is connected to its connector, rotated, and retained on the cradle in a slanted position.

A process of retaining a mobile phone 500 on the universal dock will now be described with reference to FIGS. 9 and 10. When the mobile phone 500 is connected to the connector 300, the connector 300 rotates due to the weight of the mobile phone 500, and the connected mobile phone 500 remains supported by the cradle 200. As described above, when the mobile phone 500 is disconnected from the connector 300, the elastic body returns the connector 300 to the upright position.

As described above, the universal dock according to the present invention can retain mobile phones of various sizes or types, and thus has economical merits from the viewpoint of either users or manufacturers.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A universal dock for a mobile phone, the universal dock comprising:
   a base supporter;
   a universal cradle coupled to the base supporter and adapted to cradle mobile phones of various sizes or types; and
   a connector rotatably mounted on the base supporter and not coupled directly to the universal cradle,
   wherein, when no mobile phone is cradled in the universal dock, a force is applied to the connector sufficient to rotate the connector away from the universal cradle to an original position in a vertical orientation such that a mobile phone can be mounted on the connector by vertically inserting the connector into the bottom portion of the mobile phone in the vertical orientation without the mobile phone contacting the universal cradle during the inserting,
   wherein, when the mobile phone is cradled in the universal dock, the connector inserted in a bottom portion of the mobile phone rotates such that the mobile phone is supported in contact with the universal cradle in a first slanted orientation,
   wherein the force is less than a force sufficient to overcome a weight of the mobile phone to rotate the connector such that the mobile phone is not in contact with the universal cradle,
   wherein the universal cradle comprises:
      a base coupled to the base supporter in a slanted orientation less than or equal to forty-five degrees (45°) from horizontal, the connector being rotatably received and arranged in an opening in the base;
      a back supporter extending from the base in a substantially perpendicular direction therefrom to be positioned on the base supporter in a second slanted orientation, the back supporter being adapted to retain a mobile phone, when connected to the connector, in the first slanted orientation such that the base supports the bottom portion of the mobile phone and the back supporter supports a back portion of the mobile phone; and
      an elastic body exerting the external force against a predetermined eccentricity of the rotating housing, the elastic body is adapted to provide the force so as to maintain the connector in the vertical orientation when the mobile phone is not cradled in the universal dock,
   wherein the elastic body comprises a shape of a leaf spring, and comprises:
      at least one fixed end fixed inside the base; and
      at least one curved free end extending from the fixed end, the curved free end being positioned to be forced against the predetermined eccentricity of the rotating housing so as to make a sliding surface contact when the predetermined eccentricity of the rotating housing rotates, and
   wherein the connector is rotatably mounted on the base supporter by a rotating housing.

2. The universal dock as claimed in claim 1, wherein the cradle is adapted to support a lower portion of the mobile phone below a middle portion of the mobile phone.

3. The universal dock as claimed in claim 1, wherein the mobile phone can be cradled on the cradle regardless of a transverse length, a longitudinal length, and a thickness of the mobile phone.

4. The universal dock as claimed in claim 1, wherein the fixed end comprises a center fixed end fixed to the base and left and right fixed ends symmetrically positioned on both sides of the center fixed end, respectively, the left and right fixed ends being formed by bending extensions from the center fixed end, and
   the free end comprises left and right free ends extending from the left and right fixed ends, respectively, the left and right free ends being formed by bending extensions from the left and right fixed ends.

5. The universal dock as claimed in claim 4, wherein the left and right free ends are adapted to move substantially upwards/downwards inside the base to maintain contact with the housing when the cradled mobile phone rotates.

\* \* \* \* \*